Figures 3, 4, 5:
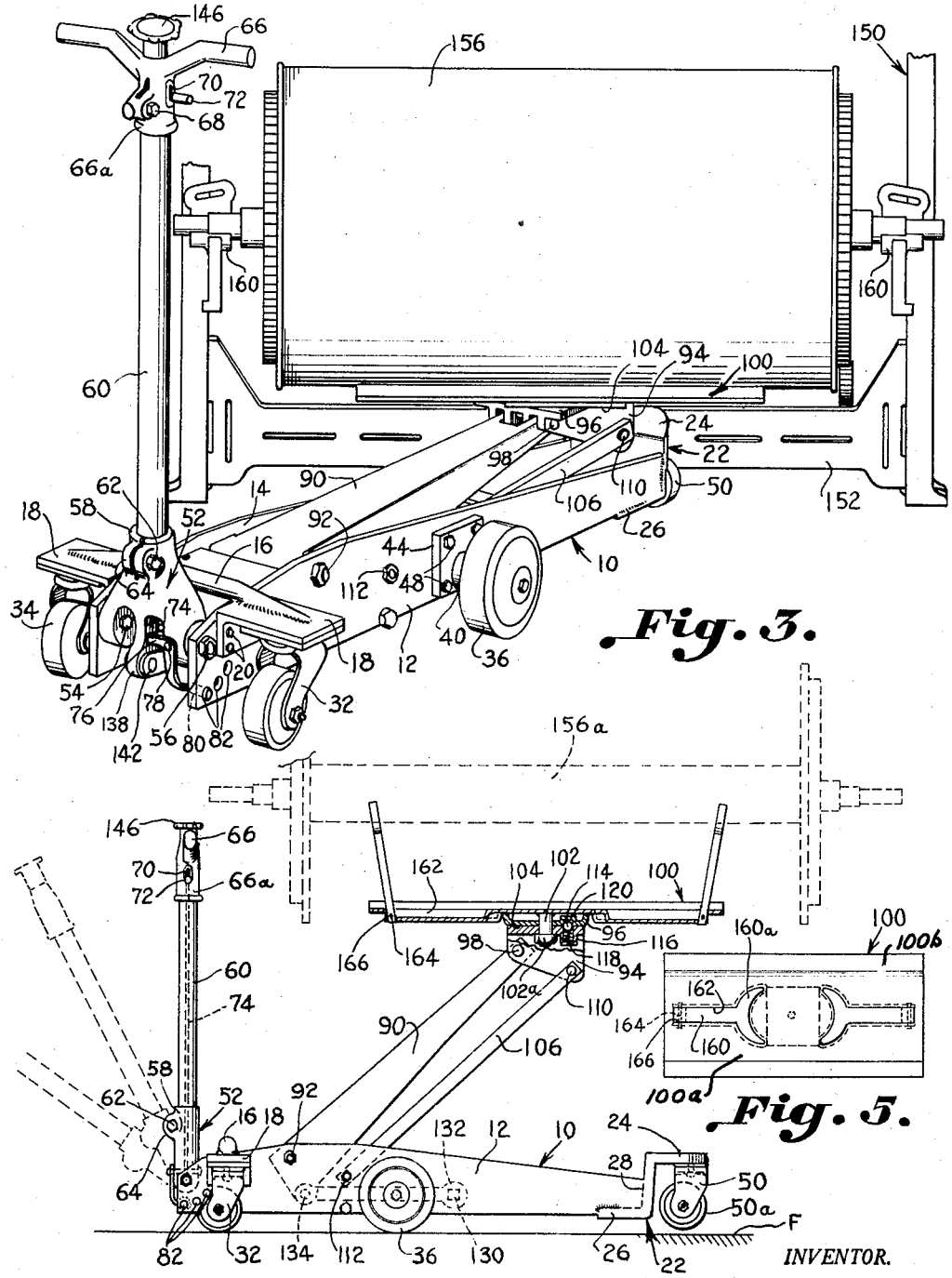

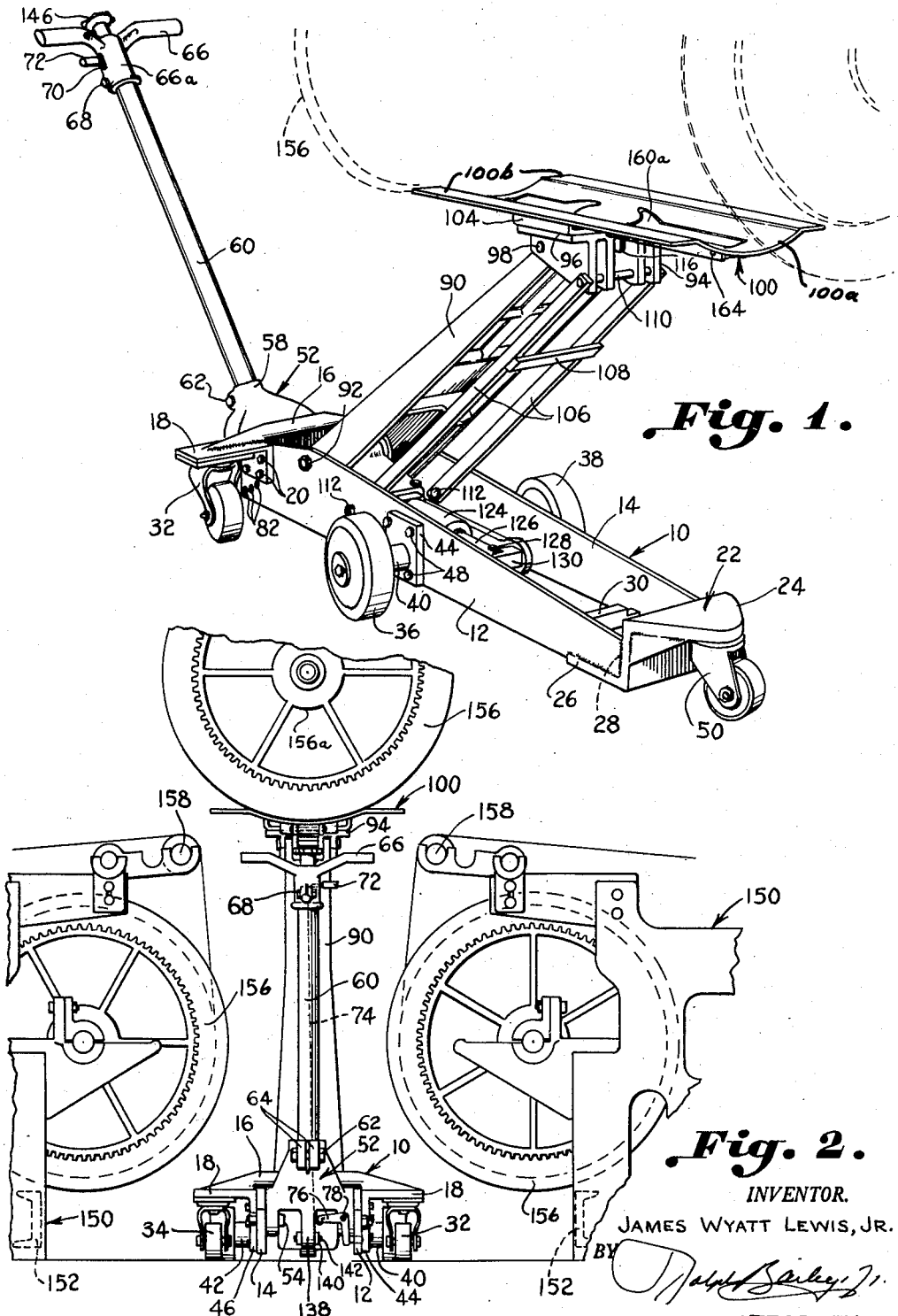

Nov. 18, 1958      J. W. LEWIS, JR      2,860,852
LIFT TRUCK

Filed June 25, 1956      2 Sheets-Sheet 2

INVENTOR.
JAMES WYATT LEWIS, JR.
BY
ATTORNEY

United States Patent Office 2,860,852
Patented Nov. 18, 1958

2,860,852

LIFT TRUCK

James Wyatt Lewis, Jr., Spartanburg, S. C.

Application June 25, 1956, Serial No. 593,761

2 Claims. (Cl. 254—10)

This invention relates generally to lift trucks and more particularly to a lift truck for use by the textile industry in mills where space is limited and loads must be elevated above relatively high obstacles.

Many mills are presently installing large warp beams in looms so that the alley width is less than the diameter of the beam. The weaver's aisle or alley is hence very narrow making it difficult to handle the heavy beams so as to maneuver warp beams down post alleys and align same with the beam bearings at the looms. The versatile truck, which forms the subject matter of this invention, will enable the carrying of warp beams at a high enough elevation to clear the whip rolls on all standard looms, and the truck cradle is restrained in a number of positions which may be automatically adjusted. The frame of the loom which passes longitudinally of the loom and adjacent the floor must be avoided by the lift truck and at the same time the cradle of the truck must be placed under the beam or cloth roll whichever the case may be. What has been described in connection with the placing of warp beams is also true of the doffing of cloth beams as well as of many other phases of the textile operations particularly where space is limited.

Accordingly, it is an object of this invention to provide a versatile, highly maneuverable lift truck which is provided with caster means adjacent the rear of the truck and a pair of spaced, aligned, relatively large wheels adjacent the medial portion of the truck together with a caster adjacent the front of the truck in which the relatively large wheels project below a plane tangent to the lower points of the casters so that the load will be always on the large wheels and one of the sets of casters except when the load is directly centered over the large wheels.

Another object of this invention is to provide a sturdy lift truck which is of simple construction and which will permit a maximum boom length relative to the length of the chassis including extensible means carried by the cradle for positioning an empty beam in superposed relation to the cradle.

Another object of this invention is to provide a lift truck having a low chassis and wheel construction such that low obstructions such as loom frames and the like which are near the floor and almost directly under loads to be lifted may be avoided.

Still another object of this invention is to provide an automatically releasable restraining means for the cradle of the lift truck which will provide restraint in a plurality of positions so as to facilitate the operation of handling cloth beams and warp beams.

I accomplish these and other objects of my invention by providing a lift truck comprising essentially an elongated relatively narrow chassis, a pair of spaced casters carried adjacent the rear of the chassis, at least one caster carried adjacent the front end of the chassis and a pair of spaced aligned relatively large wheels rotatably mounted adjacent the medial portion of the chassis projecting slightly below a plane tangent to the lower points of the casters so that, the load will be positioned on the relatively large wheels and on either the front caster or on the rear casters for all positions of the load except when the load is centered over the relatively large wheels. Also provided is a substantially Z shaped element forming the front end of the truck and being positioned in such a manner that one of the legs of the element extends and tapers forwardly from the upper portion of the chassis while the other leg of the element projects beneath and reinforces the lower portion of the chassis. Extensible means are carried by the cradle for positioning an empty beam in superposed relation to the cradle which is particularly adapted to carry beams of any desired size. Means are provided for restraining the truck cradle in a number of positions which includes a spring biased ball carried by a bearing surface fixed with respect to rotation relative to the boom and a plurality of sockets carried by a surface fixed with respect to rotation relative to the cradle.

While some of the objects of the invention have been set forth above, others will become apparent to those skilled in the art relating to lift trucks when the specification is read in connection with the accompanying drawings in which:

Fig. 1 is a perspective view looking from the front showing my improved lift truck and the cradle thereof in partially elevated position, Fig. 2 is an elevation showing the rear of the lift truck supporting a warp beam traveling down the alley between looms, Fig. 3 is a perspective view looking from the rear showing the cradle positioning a warp beam within its bearings on a loom, Fig. 4 is a side elevation, at a slightly reduced scale, looking from the right hand side of Fig. 3 showing the improved lift truck with parts in section, and Figure 5 is a plan view of the cradle, shown in Figure 4, at a slightly reduced scale showing the extensible means in lowered position.

Referring more particularly to the drawing, a relatively narrow elongated truck chassis is broadly designated at 10. The truck chassis 10 is constructed essentially of a pair of parallel aligned side frame members 12 and 14 which are bridged adjacent their rear by the bar 16 which carries brackets 18 welded to the ends of the bar. The brackets 18 are suitably secured to the side frame members 12 and 14, respectively, by any suitable means such as bolts 20. The forward portion of the side frame members 12 and 14 are bridged by a Z-bar broadly designated at 22 which is positioned so that one of the legs extends forwardly and tapers toward the front as at 24 while the other leg 26 extends beneath and reinforces the chassis of the truck. The web portion 28 of the Z-bar is suitably secured to the side frame members 12 and 14 as by welding as is the lower leg 26. The side frame members 12 and 14 are also spanned by a support 30 which is secured adjacent its end to the members 12 and 14, respectively, as by welding.

It will be noted that casters 32 and 34 are carried by the brackets 18, respectively, and that a pair of spaced aligned relatively large wheels 36 and 38 are rotatably mounted on stud shafts 40 and 42 which are in turn fixed to brackets 44 and 46, respectively. The brackets 44 and 46 are secured to the side frame members 12 and 14 as by suitable bolts 48. A caster 50 is suitably secured to the front of the chassis 10 and is carried by the forwardly extending leg 24 of the Z-bar 22.

Referring now particularly to Fig. 4, it will be noted that the caster wheel 50a is shown spaced from the floor F so that the relatively large wheels 36 and 38 would extend for a short distance below a plane tangent to the lower points of the caster wheel 50a and the casters 32 and 34. Actually the space shown in Fig. 4 is somewhat exaggerated and in practice would be about a fourth of an inch. This makes it possible for the truck to be supported by the relatively large wheels 36 and 38 and either the casters 32 and 34 or the caster 50 depending upon the position of the load and thus making for maneuverability of the truck.

A casting broadly designated at 52 bridges the rear of the chassis and is pivotally mounted between the side frame members 12 and 14, respectively, as by stub shafts 54 which are provided with a head 56 and a portion which is threaded into the side frame 12 and 14, respectively (not shown). The casting 52 thus serves as an additional support for the chassis and projects upwardly and has a split portion 58 adapted to receive a handle 60. The bolt 62 which is threadably mounted in projections 64 confines the handle 60 therein.

The handle 60 is provided with suitable handle bars 66 and with means to clamp the handle bars 66 on to the handle 60 in the form of a bolt 68. A vertical slot 70 is provided in the handle 60, which is hollow, and in the lower portion of the handle bars 66a and a pin 72 extends into the handle 60 and a suitable linkage 74 is pivotally secured to the pin 72 which is normally urged downwardly by resilient means (not shown). The lower portion of the linkage 74 is pivotally connected to a bell crank lever 76 which is pivotally secured to the casting 52 as at 78. The bell crank 76 supports a projection 80 which is adapted to extend into one of the holes 82 provided therefor in order to position the handles 60 for convenience of the operator.

A lifting boom 90 which is constructed of suitable structural shapes to provide sufficient strength for the boom is pivoted adjacent the rear of the truck chassis 10 as at 92. A cradle support 94 having a suitable bearing surface 96 is pivotally secured to the free end of the boom 90 as at 98. A cradle 100, having an elongated arcuate portion 100a and horizontally disposed portions 100b, is rotatably mounted on the cradle support 94 on the spindle 102 which is rotatably mounted in the spindle support 94 and secured therein by the nut 102a. The cradle 100 is provided with a suitable bearing surface 104 which contacts the cradle support bearing surface 96.

Means are provided to maintain the cradle in a substantially level position for all positions of the boom in the form of links 106 which are provided with a bracing member 108 and which are pivoted on one end to the cradle support 94 as by the pin 110. The links 106 are pivoted on the other end on the chassis 10 as at 112. It will be noted that the cradle support 94 is relatively broad so as to provide considerable space between the boom 90 and the links 96 so as to provide a firm support for the boom and to permit accurate leveling of the cradle.

Extensible means in the form of arms 160 are adapted to be received in depression 162 in said cradle flush with the surface thereof. The arms 160 are pivoted as at 164 and are adapted to be restrained in divergent relation, as shown in Fig. 4, within the cut-out portion 166. Arcuate elements 160a are carried by the free ends of the arms 160 to carry empty beams.

Means for restraining the cradle in a desired position which may be automatically released are provided in the form of a ball 114 which is carried within a cylinder 116 in which a spring 118 is positioned to urge the ball 114 against the bearing surface 104 and into sockets 120 carried by the bearing surface 104 for providing restraint against rotation of the cradle 100 with respect to the boom 90. Such positions of restraint may be provided at any desired points and it is particularly desirable that the cradle be capable of being restrained in a position longitudinally of the chassis and at 90 degrees to the chassis.

Suitable hydraulic means are provided for raising the boom 90 and the load carried by the cradle 100 similar to the means provided in United States Patent No. 2,189,010, J. W. Lewis, February 6, 1940. These means include a cylinder 124 which carries a piston 126 which is pivoted as at 128 on a transverse member 130. The transverse member 130 is pivotally mounted adjacent its end in a yoke 132 which is in turn pivotally mounted as at 134 on the lower portion of the boom 90. Referring to Figs. 2 and 3, it will be noted that the casting 52 is provided with a projection 138 which carries a yoke 140 pivotally mounted thereto as at 142. This yoke 140 operates a spring biased piston (not shown) in order to build up pressure in the cylinder 124 so as to exert pressure against the piston 126 to thus raise the boom 90. A let-off valve (not shown) is controlled by a threaded handle 146 carried by the handle bars 66 to relieve the pressure against the piston so that the boom may be lowered.

Referring now particularly to Fig. 2, it will be noted that the lift truck is shown passing down the weaver's aisle between the looms, the frames of which are broadly designated at 150. It will be noted that the frame 150 includes a back girt 152 which is positioned closely adjacent the floor and beneath the warp beam 156. It will be further noted that a full warp beam 156 is carried above the whip rolls 158 of the looms and that the aisle is of considerably less width than a full warp beam. Fig. 3 shows the lift truck positioning a full warp beam 156 in its bearings 160 and shows the cradle partially rotated so as to effect the placement of the warp beam 156. In practice the chassis 10 of the truck is pivoted about the relatively large wheels 36 and 38 and the cradle 100 is rotated slightly to align the warp beam 156 with its bearings 160, the handle 60 being fixed in fully lowered position to pass beneath adjacent warp beams. The cradle 100 is simultaneously lowered when the truck is pivoted so as to avoid the whip rolls 158. The positioning of the front caster 150 in the medial portion of the forwardly extending tapering portion of the Z-bar 24 makes possible the avoiding of all obstructions such as the back girt 152 and treddles and selvage brackets (not shown) adjacent the floor since the truck chassis 10 does not extend beyond the cradle when the cradle is in normal position to handle warp beams and the like. When necessary the arms 160 may be raised to carry an empty beam above obstructions, as though the beam were full, as shown in Fig. 4.

It is thus seen that I have provided a highly maneuverable and versatile lift truck for use in textile mills. The use of the Z-bar construction at the front of the truck makes possible great strength while permitting the cradle mounting to nest within the Z-bar on the support 30 permitting a relatively long boom length. The tapering leg of the Z-bar makes possible the mounting of a caster which will not interfere with obstructions located almost immediately beneath the load to be lifted. The narrowness of the truck chassis and the length of the boom permits the carrying of a load down a narrow alley over all of the working parts in the weaver's aisle. The truck can be taken down the aisle in raised position and then lowered beneath a roll of cloth to be doffed. The particular positioning of the wheels makes possible a highly maneuverable and versatile truck and means for restraining the cradle in desired positions from which the cradle may be automatically released makes for simplified handling of heavy loads.

While a preferred embodiment of my invention has been described using specific terms, such description is for illustrative purposes only, and it is to be understood that changes and variations may be made without departing from the spirit or scope of the invention as defined by the appended claims.

I claim as my invention:

1. A lift truck comprising an elongated narrow chassis, at least one caster carried adjacent the rear of the chassis, a pair of spaced aligned relatively large wheels rotatably mounted adjacent the medial portion of the chassis, an element having a pair of horizontal legs and a vertical web forming the front end of the truck, said element being positioned in such a manner that one of the legs of the element extends forwardly from the upper portion of the chassis while the other leg of the element projects beneath and reinforces the lower portion of the chassis, a caster carried by said forwardly extending leg, said relatively large wheels projecting slightly below a plane tangent to the lower points of the casters, a relatively long lifting boom pivoted adjacent the rear of the chassis, a cradle carried by the free end of the boom and being positioned so that the free end of said boom nests within the chassis above said other leg and closely adjacent the web when in lowered position, the disposition of the web and legs of said element on said chassis providing space for nesting a boom of maximum length as well as maximum strength for the truck, means mounting the cradle for adjustment about a vertical axis, and means maintaining the cradle substantially level for all positions of the boom whereby, the load will be positioned on the relatively large wheels and either on the front caster or on the rear caster for all positions of the load except when the load is centered over the relatively large wheels and whereby, the cradle may be placed under a load without encountering obstructions adjacent the floor beneath the load.

2. A lift truck as described in claim 1 wherein the forwardly extending leg of said element tapers forwardly.

References Cited in the file of this patent

UNITED STATES PATENTS

| | | |
|---|---|---|
| 1,630,619 | Kimber | May 31, 1927 |
| 1,650,810 | Weaver | Nov. 29, 1927 |
| 1,930,078 | Bentley | Oct. 10, 1933 |
| 2,189,010 | Lewis | Feb. 6, 1940 |
| 2,205,664 | Mayer | June 25, 1940 |
| 2,209,581 | Remsen | July 30, 1940 |
| 2,216,972 | Gibson et al. | Oct. 8, 1940 |
| 2,454,840 | Ryan | Nov. 30, 1948 |
| 2,536,550 | Hughes | Jan. 2, 1951 |
| 2,568,827 | Schallock | Sept. 25, 1951 |
| 2,608,313 | Wilson | Aug. 26, 1952 |
| 2,706,052 | Trautman | Apr. 12, 1955 |
| 2,727,637 | Weaver | Dec. 20, 1955 |